Jan. 7, 1964
L. F. LEMM ETAL
3,117,299
METHOD AND APPARATUS FOR AIRCRAFT CONTROL OF AIRPORT LANDING LIGHTS
Filed Oct. 28, 1958
2 Sheets-Sheet 1
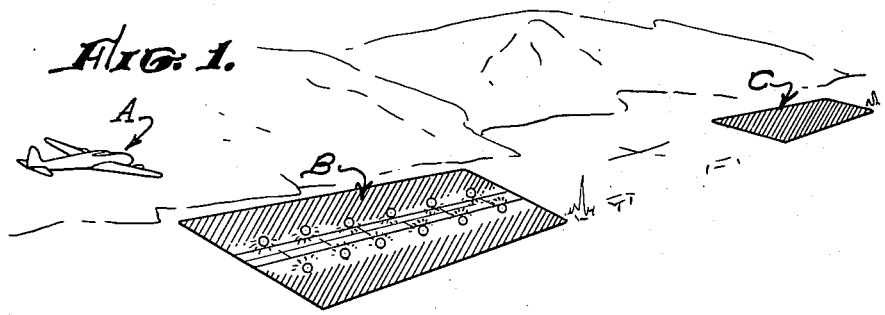
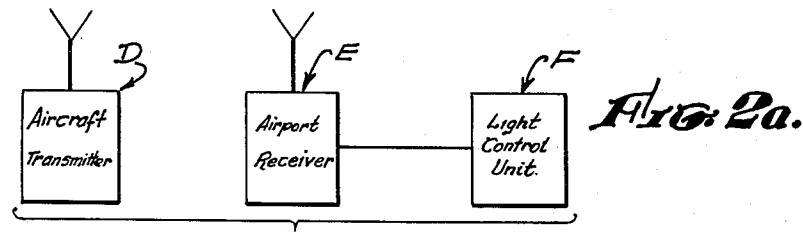
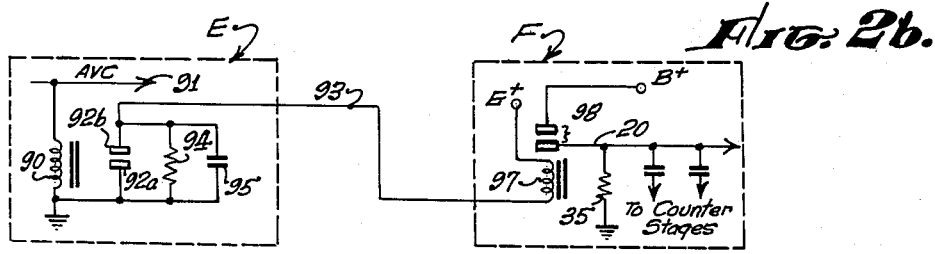
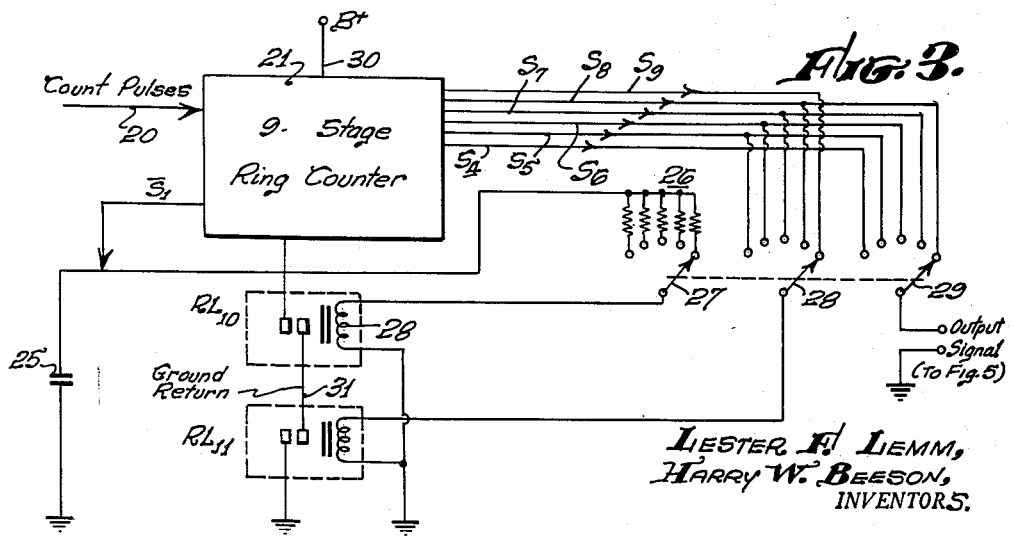
LESTER F. LEMM,
HARRY W. BEESON,
INVENTORS.
BY
William C. Babcock
ATTORNEY.

Jan. 7, 1964     L. F. LEMM ETAL     3,117,299
METHOD AND APPARATUS FOR AIRCRAFT CONTROL OF
AIRPORT LANDING LIGHTS
Filed Oct. 28, 1958     2 Sheets-Sheet 2

LESTER F. LEMM,
HARRY W. BEESON,
INVENTORS.

BY William C. Babcock

ATTORNEY.

United States Patent Office 3,117,299
Patented Jan. 7, 1964

3,117,299
METHOD AND APPARATUS FOR AIRCRAFT
CONTROL OF AIRPORT LANDING LIGHTS
Lester F. Lemm, 8180 E. 21st, Westminster, Calif., and
Harry W. Beeson, Fullerton, Calif., assignors, by direct
and mesne assignments, of six-twelfths to Charles A.
Bauer, Huntington Beach, Calif., three-twelfths to said
Lester F. Lemm, and three-twelfths to Robert P. Swift
Filed Oct. 28, 1958, Ser. No. 770,062
5 Claims. (Cl. 340—26)

The present invention relates to a method and apparatus by which the landing lights of an airport may be turned on under control of the pilot of an aircraft which is about to make a night landing.

Many small airports are used only occasionally and hence are manned by operators only during certain restricted hours. If an operator were to be maintained on duty throughout the night the cost of his wages would prohibitively increase the operating expenses of the air port.

Two different arrangements are widely used by small airports which are unmanned during the night. According to one arrangement the landing lights are permitted to burn continuously during the night so that any craft which seeks to land may do so. Modern landing lights have been developed which have a very high degree of visibility during fog and similar atmospheric conditions. Such lights require a large amount of electricity for their operation, however, hence the small airport which keeps its landing lights burning during the night must incur a very substantial expense for that purpose.

The other arrangement used by unmanned airports is to keep the landing lights turned off, and to utilize the services of a policeman, night watchman or other available person for turning them on when and as needed. According to this arrangement the aircraft is required to "buzz" the field in order to indicate a desire to land. The lights are then turned on by the policeman, night watchman or other responsible person, although it may be necessary for him to drive several miles by automobile in order to reach the airport. The limitations of such an arrangement are readily apparent.

According to the present invention a method and apparatus are provided which permit the landing lights to be turned on under the control of the pilot who is about to land. A predetermined set of signals is transmitted from the aircraft in a predetermined frequency channel. A radio receiver and a light control unit are provided at the airport, the receiver being tuned to the predetermined transmission frequency and being energized in a receptive condition at all times. The light control unit is coupled to the receiver and is adapted to respond to the predetermined set of signals for turning on the landing lights.

In carrying out the method of the present invention the radio transmitter in the aircraft cannot feasibly be directionalized, hence the problem arises that where two or more airports are located in the same vicinity there must be some means of selecting the particular one at which the pilot wishes to land. In accordance with the invention, therefore, a code is provided such that a different identification is assigned to each airport in a particular geographical area. In transmitting the command for the lights to be turned on the pilot selects the code identifications for the particular airport at which he wishes to land.

An object of the invention, therefore, is to provide a method and apparatus for turning on the landing lights of an airport under the control of the pilot of an aircraft which is about to make a night landing.

Another object of the invention is to provide a method and apparatus whereby the pilot of an aircraft about to make a night landing may select a particular landing field, and may cause its landing lights to be turned on.

A further object of the invention is to reduce the maintenance expense of airports by providing automatic means for turning the landing lights on and off at night, thus making it unnecessary for the airport to be manned during the night.

An additional object of the invention is to provide a light control apparatus which may be installed in an airport and utilized in conjunction with conventional radio communication equipment for turning on landing lights when an aircraft approaches for a night landing.

The above and other objects of the invention will be more readily understood from the following description in conjunction with the accompanying drawing in which:

FIGURE 1 illustrates an aircraft which is about to make a night landing;

FIGURE 2a illustrates in block form the radio communication system which is utilized to carry out the novel method of the invention;

FIGURE 2b is a schematic wiring diagram of a circuit for transmitting pulses from the receiver to the light control unit of FIGURE 2a;

FIGURE 3 is a schematic diagram, partially in block form, of a counter and selection circuit for identifying the received pulse series;

Figure 4:
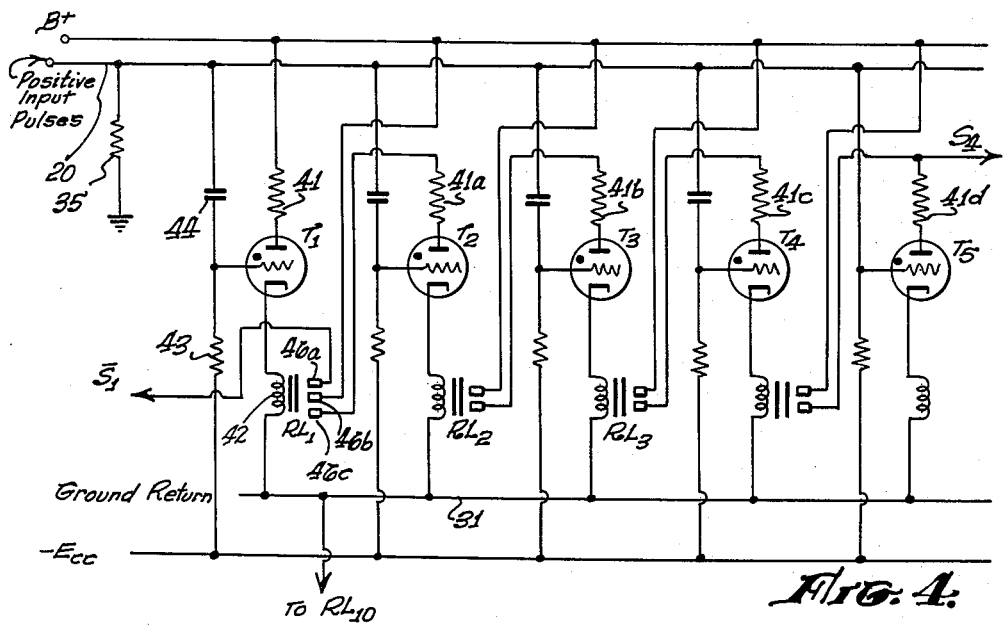
FIGURE 4 is a schematic wiring diagram of the first five stages of the counter of FIGURE 3.

Referring now to the drawings, FIGURE 1 illustrates an aircraft A which is about to make a night landing and which was faced with a choice as to whether to land at a landing field B or a landing field C. The pilot having already decided to land at B and having transmitted the corresponding set of coded signals in accordance with the invention, the landing lights of B have been turned on and clearly illuminate the landing strip.

The method of control provided by the invention has many very practical advantages which will be described in conjunction with FIGURES 2a and 2b. The code system selected in accordance with the invention is simply a series of pulses, the number of pulses in the series differing for each landing field in a particular area. Thus, for one landing field the code signal will be four pulses while for other landing fields in the same area the code will be five, six, seven or eight pulses.

As shown in FIGURE 2a the signals transmitted by transmitter D on the aircraft are received by a radio receiver E at the landing field from whence they are fed to the light control unit F. Receiver E is turned to a single fixed frequency with the tuning being preferably maintained by a crystal. The fixed frequency preferably lies in the VHF range and may, for example, be 122.8 megacycles. Transmitter D may be a conventional voice transmitter which is adapted to operate on any of several selected frequencies. Transmitter D is preferably equipped with a crystal which is tuned to the receiver frequency (here assumed to be 122.8 mc.) and is also provided with a selector switch by which the pilot or radio operator may select a desired transmission frequency.

In accordance with the invention the pilot of the aircraft may turn on the landing lights simply by setting the selector switch to the predetermined transmission frequency (such as 122.8 mc.), and then pressing his microphone button the appropriate number of times. Each time the microphone button is pressed the transmitter is turned on and generates a carrier wave at the fixed frequency to which the receiver is tuned. It is then necessary at the receiver to detect only the beginning of each reception of the carrier wave.

In other words, each time the pilot depresses his microphone button the carrier wave is turned on until he releases the button. For the purposes of the present invention it is largely immaterial how long the carrier is turned on since there is no necessity for distinguishing between "dots" and "dashes." It is also largely immaterial as to the magnitude or strength of the carrier wave which is received at the landing field, so long as it exceeds the necessary minimum for reliable communication.

Referring now to FIGURE 2b it will be seen that in the receiver E a relay coil 90 is provided which is coupled in parallel between the automatic volume control (AVC) line 91 and ground. Normally open relay contacts 92 are controlled by coil 90, contact 92a being connected to ground while 92b is connected via a lead 93 to the light control unit F. A resistor 94 and a capacitor 95 are coupled in parallel with relay contacts 92 to permit sensitive operation without sticking.

In light control unit F a relay coil 97 is coupled between a source of positive potential E+ and the signal line 93. A normally open pair of relay contacts 98 are controlled by the coil 97 for intermittently applying the positive B+ potential to a pulse input line 20.

The operation of the circuit of FIGURE 2b is as follows. Whenever the carrier is turned on the AVC voltage in the receiver increases in a step-wise manner and causes relay contacts 92 to close. Current then flows through coil 97 causing contacts 98 to close and a positive pulse to be applied to the counter circuit. When contacts 92 open and permit contacts 98 to open, a corresponding negative pulse appears on the input line 20, but the counter circuit included in light control unit F is insensitive to negative pulses as will appear from the ensuing description.

Figure 5:
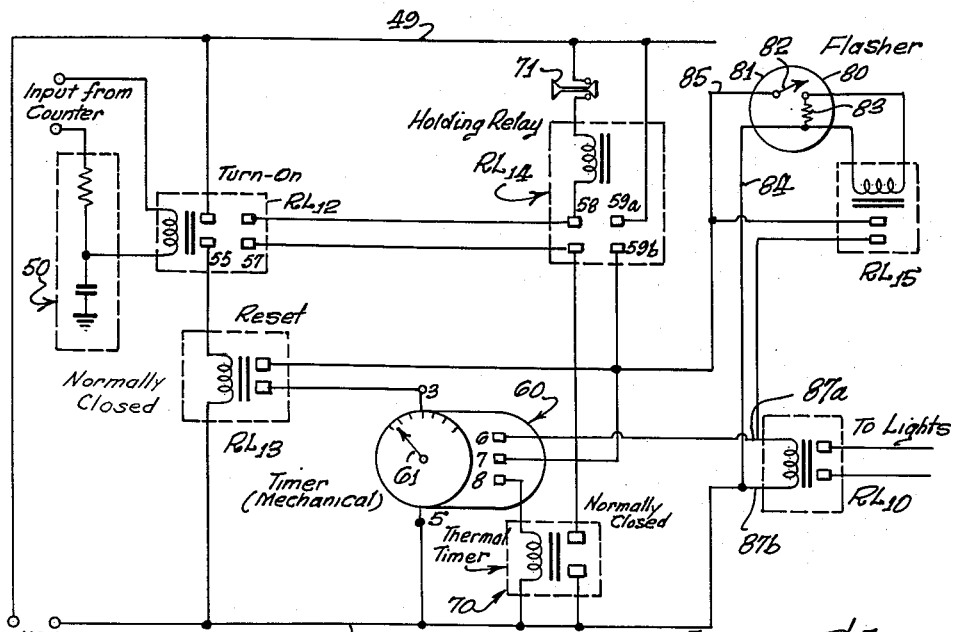
FIGURE 5 illustrates schematically the timing mechanism which is initiated into operation by a signal from the circuit of FIGURE 3 for turning on the lights.

The electronic circuitry illustrated in FIGURE 3, 4 and 5 performs the function of receiving and identifying the pulse series and of turning on the lights in response thereto. One special feature of the circuit operation is that the requisite number of pulses must be received within a specified time. For example, if the equipment has been set to accept only a series of five pulses then it is necessary that five separately identified pulses be received within a fixed, relatively short time interval, in order to turn on the lights.

Another unique feature of the circuit operation is that if more than the desired number of pulses are received within the specified time interval the lights will not be turned on. Thus, if the equipment is set to accept five pulses in a 6½-second interval but six pulses are received within this period of time then the lights will not turn on.

An additional feature of the circuit operation is that the timing mechanism may be reset at any tme to start from the beginning of the cycle. Thus, if the pilot of an aircraft attempting to make a landing is not certain whether the lights will remain on long enough to complete his landing he may at any time send a new series of pulses which will cause the timing mechanism to reset and hence cause the lights to remain on for a predetermined period of time after the reception of the last set of turn-on signals.

Referring now to FIGURE 3 it will be seen that count pulses indicated by an arrow 20 are applied to a counter circuit 21 illustrated only in block form. The counter circuit is a 9-stage ring counter of the type in which each applied count pulse causes one additional counter stage to become conductive. That is, after two count pulses have been received only the first two stages are conductive, whereas after a total of seven count pulses have been received all of the first seven stages are conductive. Wiring details of a suitable counter circuit are illustrated in FIGURE 4 and will be discussed in a later paragraph.

In FIGURE 3 the counter 21 is shown to provide output signals $\bar{S}_1$, $S_4$, $S_5$ . . . $S_9$ which are produced on corresponding output leads. Each output signal is derived from the corresponding stage of the counter. Lead $\bar{S}_1$ provides a positive output voltage when its corresponding counter stage (the first stage) is non-conducting, and becomes isolated from the circuit when the first stage conducts. The other output leads $S_4$ . . . $S_9$ provide positive potential when their corresponding stages are conductive.

An electronic timer is provided which includes a capacitor 25, resistors 26 of which a particular one is selected by the switch 27, and an inductance coil 28. Inductance coil 28 forms a part of a relay $RL_{10}$ as will subsequently be explained. The capacitor, resistor and inductance coil of the electronic timer are arranged in a series loop configuration. Prior to the time when any count pulses have been received, the first stage of counter 21 remains non-conductive and output lead $\bar{S}_1$ provides a positive potential to the electronic timer. This potential is applied across capacitor 25 which is therefore normally charged, and also across the resistor and inductance coil in series so that a first predetermined magnitude of current normally flows through the inductance coil 28. When the first count pulse is received and the first counter stage becomes conductive the positive potential $\bar{S}_1$ is no longer supplied to the electronic timer, and energy previously stored in capacitor 25 then flows through resistor 26 and inductance coil 28.

Counter 21 is energized via a lead 30 connected to B+ and a ground return lead 31. The contacts of relay $RL_{10}$ are connected in series in the ground return line 31 for the purpose of selectively disabling the counter when the electronic timer has completed its timing cycle. Thus, the contacts of relay $RL_{10}$ are normally held closed by the current flowing through inductance coil 28, and when the timing cycle starts and capacitor 25 gradually loses its charge the current through inductance coil 28 eventually drops to a second predetermined magnitude which is insufficient to keep the relay closed. The relay then opens and disables the counter circuit and inhibits any of the output signals $S_4$ . . . $S_9$ from being produced. The duration of the timing cycle of the electronic timer is determined by the potential to which capacitor 25 is normally charged as well as by the R, L and C of the values of the circuit. Switch 27 permits the selection of any one of the five resistors constituting the resistor bank 26.

Selector switch 28 controls a relay $RL_{11}$ for disabling the counter circuit in the event that an excess number of count pulses are received during the time interval established by the timing cycle of the electronic timer as previously described. Relay $RL_{11}$ has a pair of normally closed contacts which are connected in series in the ground return line 31. Selector switch 28 has five possible positions for selecting any one of the output signals $S_5$ to $S_9$, inclusive, and for applying same to the operating coil of relay $RL_{11}$. Thus if the circuit is set to accept five pulses selector switch 28 is in its next to the left-hand position so as to receive signal $S_6$. If a sixth pulse is received by the counter the sixth counter stage becomes conductive, and output lead $S_6$ delivers positive potential to the operating coil of relay $RL_{11}$ which consequently interrupts the circuit and disables the counter.

Thus it will be seen that if the requisite number of pulses is not received fast enough the counter will become disabled upon the completion of the timing cycle of the electronic timer associated with switch 27, before delivering any output signal to the timing mechanism of FIGURE 5. If an excess pulse is received within the permitted time period it is fed back via switch 28 to $RL_{11}$ and again disables the counter. If the correct number of pulses occurs within the required time period then the output signal produced by counter 21 is applied via selector switch 29 to the timing mechanism of FIGURE 5.

Each of selector switches 27, 28 and 29 has five possible positions, and the three switches are mechanically linked together. The five positions of switch 29 correspond to output leads $S_4$ to $S_8$, inclusive. Thus, if the circuit is set to accept four pulses, switch 29 transmits signal $S_4$ to the timing mechanism of FIGURE 5. Switch 28 in its corresponding position is connected to output lead $S_5$ for disabling the counter if an excess pulse is received. Switch 27 is in the corresponding position and selects a resistance value providing an appropriate timing interval for the reception of four pulses.

As will be explained in connection with FIGURE 5 an output signal generated by the counter of FIGURE 3 must be available for a predetermined time period in order to actuate the timing mechanism of FIGURE 5. In the case where one or more excess pulses are received, therefore, the circuit of FIGURE 3 actually transmits an output pulse via switch 29, but the time duration of this output signal is insufficient to turn on the lights since the counter circuit is disabled by the next-received pulse.

Reference is now made to FIGURE 4 where the details of a suitable counter circuit are illustrated. Thyratron tubes $T_1$, $T_2$, $T_3$, $T_4$ and $T_5$ are utilized as the conducting elements of corresponding stages. Referring in detail to the first stage, a load resistor 41 is coupled between the B+ power supply line and the plate of tube $T_1$, while a relay coil 42 is coupled between the cathode and ground return line 31. The grid of $T_1$ receives bias potential from a negative source $-Ecc$ via a grid resistor 43. Positive pulses applied to the input line 20 are transmitted to the grid of $T_1$ via a coupling capacitor 44. Resistor 35 is connected between input line 20 and ground. Inductance coil 42 controls the contacts of a relay $RL_1$. Relay $RL_1$ has an upper contact element 46a, a lower contact element 46c and a middle contact element 46b which selectively engages either the upper element or the lower element. The middle contact element 46b normally engages the upper element 46a when no energizing current is present in coil 42. The upper contact element 46a is connected to output lead $\overline{S}_1$, while the middle element 46b is connected to the B+ supply line. Therefore, when thyratron $T_1$ is not conducting the B+ potential is supplied via output lead $\overline{S}_1$ for maintaining capacitor 25 of the electronic timer of FIGURE 3 in a charged condition.

The lower contact element 46c of relay $RL_1$ is coupled through a resistor 41a to the plate of tube $T_2$. The second stage is generally similar to the first stage but receives energizing potential at its plate only when the first stage is conducting so as to maintain relay $RL_1$ in its operative (as distinguished from its quiescent) condition. Relay $RL_2$ associated with the cathode circuit of tube $T_2$ has only two contacts, which are normally open but which become closed when $T_2$ is conductive and thereby cause plate potential to be applied via resistor 41b to $T_3$. The third and fourth stages are constructed in the same manner as the second stage. In the fifth stage an output lead $S_4$ is connected to the upper end of the plate load resistor 41d. Output lead $S_4$ is therefore energized at the B+ potential when $T_4$ is conducting and its associated relay is closed. The remaining stages of the counter, while not illustrated in detail, may be identical to the fifth stage.

Reference is now made to FIGURE 5 illustrating the timing mechanism which is selectively actuated by the circuit of FIGURE 3, and which in turn controls the airport lights. The input signal from counter 21 is applied via a time-delay circuit 50 to the operating coil of a relay $RL_{12}$. The purpose of time-delay network 50 is to delay the operation of relay $RL_{12}$ for a sufficient time interval to permit the circuit of FIGURE 3 to discriminate against any excess pulses which may be received. The circuit constants are preferably adjusted so that the time required to operate relay $RL_{12}$ corresponds approximately to the time required to receive two successive pulses. For example, if pulses are received at the rate of one per second, if the circuit is set to accept five pulses, and if the electronic timer of FIGURE 3 is set at 6½ seconds, it will then require approximately two seconds after reception of the fifth pulse to actuate relay $RL_{12}$. A sixth pulse received at the same spacing as the previous pulses of the series would disable counter 21 before relay $RL_{12}$ could operate. On the other hand, if the pilot were to transmit the first five pulses at one-second intervals and then wait at least two seconds before transmitting the sixth pulse, the result would be that the landing lights would turn on. It might be said that in this instance the circuit fails to discriminate against the sixth or excess pulse, but this result occurs only where the excess pulse has a far greater spacing after its predecessor than do the previous pulses in the series.

Relay $RL_{12}$ includes a first pair of contacts 55 and a second pair of contacts 57. Contacts 55 are connected in series with the operating coil of a relay $RL_{13}$, the series combination being connected across an A.C. voltage source. Actuation of relay $RL_{12}$ causes both sets of its contacts to close with the result that a holding relay $RL_{14}$ becomes energized.

A mechanical timer 60 is utilized which accomplishes the primary function of keeping the lights turned on for a predetermined time. The timer 60 is of conventional design and operates as follows. An indicator needle 61 indicates the amount of time elapsed since the mechanism was actuated. A pair of electrical terminals 3 and 5 are provided, to which an alternating electrical potential is applied for actuating the mechanical timer. A set of relay contacts 6, 7 and 8 are provided whose operation is controlled by the timer. Contact element 6 normally engages element 7 and is not connected to element 8. When the mechanical timer reaches a predetermined setting, relay element 6 moves to an alternate position in which it engages contact element 8 rather than element 7. When the electrical potential applied to terminals 3 and 5 is released the element 6 returns to its initial position in which it engages element 7. The timer is further characterized by the fact that if prior to reaching its predetermined time setting the potential applied to terminals 3 and 5 is released, reapplication of potential to the terminals 3 and 5 causes indicator 61 to return to its zero position and the timer to run through its complete cycle before relay element 6 is actuated to its alternate position.

Terminal 5 of timer 60 is connected to one side 48 of the A.C. line while terminal 3 is coupled through the contacts of relay $RL_{13}$ and contacts 59a, 59b of relay $RL_{14}$ to the other side 49 of the A.C. line. The contacts of relay $RL_{13}$ are normally closed. Therefore, when holding relay $RL_{14}$ is energized in response to the actuation of relay $RL_{12}$, the result is that line potential is applied to terminals 3 and 5 of the timer 60 which therefore commences its timing cycle.

In holding relay $RL_{14}$ a pair of contacts 58 are connected in series with the holding coil. The contact elements 58 are also connected in parallel with contact pair 57 in relay $RL_{12}$. A thermal timing unit 70 has a pair of normally closed relays which are serially connected between A.C. supply line 48 and one of contact elements 58. The other end of the holding coil of relay $RL_{14}$ is connected through a release switch 71 to the other A.C. supply line 49.

Energization of holding relay $RL_{14}$ takes place as follows. Actuation of $RL_{12}$ causes contacts 57 to close, thus providing a closed circuit between contacts 58 of $RL_{14}$. Since release switch 71 is normally closed there is a continuous current path provided from A.C. line 49 through the holding coil of $RL_{14}$, contacts 58, and the normally closed contacts of timer 70, to the A.C. line 48. The flow of current through the holding coil of $RL_{14}$ closes contact pairs 58 and 59. The closing of contacts 58 insures the continued flow of current through the holding relay which therefore remains closed.

Resetting or extending the timing period of timer 60 takes place as follows. If relay $RL_{14}$ is closed the closing of contacts 57 in response to an input signal has no additional effect upon $RL_{14}$. Actuation of relay $RL_{12}$ produces a surge of current through the coil of relay $RL_{13}$ which causes the normally closed contacts of $RL_{13}$ to momentarily open. Since the applied potential is removed, timer 60 therefore resets itself to the beginning of its cycle. When the contacts of $RL_{13}$ return to their closed position the line potential is again applied to terminals 3 and 5, and timer 60 is again in operation.

Timer 60 is set for a predetermined time, for example, thirteen minutes. At the end of that interval the movable element 6 disengages element 7 and engages element 8, thus bringing into operation both a thermal timer 70 and a flasher unit 80. The operation of these latter two units will now be described. Flasher 80 includes an enclosure 81 within which a thermal switching element 82 and a heating element 83 are serially connected. Switching element 82 closes when the temperature within the enclosure drops to a predetermined lower level, thus establishing a closed circuit for heating element 83. When the generation of heat raises the temperature to a predetermined upper level, switching element 82 opens and interrupts the circuit. Current is supplied to the flasher via a lead 84 connected to A.C. line 48 and a lead 85 connected to contact 59b of relay $RL_{14}$.

Flasher 80 controls a relay $RL_{15}$ whose actuating coil is connected in parallel with heating element 83. The contacts of $RL_{15}$ control the flow of current to relay $RL_{16}$, which in turn controls the turning on of the airport lights.

Flasher unit 80 and relay $RL_{15}$ are disabled except when holding relay $RL_{14}$ is closed. One of the contacts of $RL_{15}$ is connected to contact 59b of $RL_{14}$, while the other is connected to one end 87a of the actuating coil of $RL_{16}$. The other end 87b of the actuating coil is connected to the A.C. line 48.

Movable element 6 of timer 60 is connected to contact 59b of $RL_{14}$, while contact element 7 is connected at 87a to $RL_{16}$. The contacts 6—7 of timer 60 and the contacts of $RL_{15}$ are therefore effectively in parallel. During the timing cycle of timer 60 element 6 engages contact 7 thus providing current to $RL_{16}$ for keeping the airport lights turned on. At the same time the flasher 80 and relay $RL_{15}$ are effectively shunted out of the circuit, although the flasher receives driving power and continues to operate.

When timer 60 completes its cycle movable element 6 disengages contact 7 and engages contact 8. Current then for the first time becomes supplied via contact 8 of timer 60 to the control winding of thermal timer 70. Current is supplied to $RL_{16}$ only intermittently through the contacts of $RL_{15}$ under control of flasher unit 80, and the lights flash on and off. When sufficient heat has been generated the normally closed contacts of timer 70 open, thus de-energizing holding relay $RL_{14}$ and disabling the entire circuit.

Thermal timer 70 preferably has an operating period of two minutes, during which the lights are flashed on and off intermittently. Flasher 80 is preferably selected so that it is on for five seconds and then off for one second. Thus the lights flash once every six seconds, or twenty times during the period of control by thermal timer 70.

It will therefore be seen that the timing mechanism of FIGURE 5 normally turns on the lights for thirteen minutes and then flashes the lights (in a six-second cycle) for two minutes. The lights are then automatically turned off. But if the aircraft pilot transmits a new set of turn-on signals the entire timing cycle again starts from its beginning. This is true whether the new set of turn-on signals are received during the first thirteen minutes when the lights are burning continuously, or during the last two minutes while the lights are flashing.

While not specifically illustrated herein the circuit of the present invention may advantageously be used for other purposes of airport control. For example, the intensity of the landing lights may be set at any one of several intensity levels. Also, the wind indicator may be turned to a particular angular position in order to permit the pilot to observe the wind velocity in that particular direction. The convenience of transmission of signals by the pilot, as well as the extremely reliable operation of the circuit in distinguishing and responding to the received pulses, combine to make the apparatus of the present invention useful for a variety of different purposes.

Although my invention is fully capable of achieving the results and providing the advantages hereinbefore mentioned, it is to be understood that it is merely the presently preferred embodiment thereof, and that we do not mean to be limited to the details of construction above described other than as defined in the appended claims.

We claim:

1. Apparatus for turning on the landing lights of an airfield in response to the reception of a radio carrier wave of a predetermined frequency intermittently transmitted from an aircraft which is about to make a night landing, said apparatus including means for generating a pulse of a predetermined polarity each time the carrier wave is turned on, an electronic counter circuit, means for applying said pulses to said counter circuit, output circuit means coupled to said counter circuit for producing an output signal in response to the last one of a predetermined number of said pulses, time delay means coupled to said output circuit means for receiving said output signal, light control apparatus coupled to said time delay means for turning on the landing lights in response to the delayed output signal, means for disabling said electronic counter circuit and said output circuit means a predetermined time period after the first of said pulses is applied to said counter, and additional means for disabling said electronic counter circuit and said output circuit means in response to the reception of an excess pulse by said counter circuit within said predetermined time period.

2. Apparatus as claimed in claim 1 in which the time delay provided by said time delay means is greater than the average time spacing between said pulses when said predetermined number of pulses is applied to said counter circuit within said predetermined time period.

3. Airport control apparatus for controlling a predetermined operation in response to the intermittent reception of a predetermined carrier frequency, said apparatus including means for generating a pulse of a predetermined polarity each time the reception of the carrier wave is initiated, an electronic counter circuit, means for applying said pulses to said counter circuit, means for producing an output signal in response to the reception by said counter circuit of the last one of a predetermined number of said pulses, means for disabling said output signal means unless all of said predetermined number of pulses are applied to said counter within a predetermined time period, and additional means for disabling said output signal means in response to the application of an excess pulse to said counter within said predetermined time.

4. Apparatus as claimed in claim 3 wherein said pulse generating means includes a receiver having an automatic volume control circuit; a relay having an operating coil and a pair of normally open contacts, said operating coil being coupled to said automatic volume control circuit to be driven thereby; and circuit means connecting said pair of contacts in series with the input of said electronic counter circuit; said circuit means being operable to pass only positive pulses to said electronic counter circuit.

5. Apparatus as claimed in claim 4 which further includes a resistor coupled in parallel with said contacts, and a capacitor coupled in parallel with said contacts.

References Cited in the file of this patent

UNITED STATES PATENTS

| | | |
|---|---|---|
| 2,094,733 | Byrnes | Oct. 5, 1937 |
| 2,235,804 | Macalpine | Mar. 18, 1941 |
| 2,325,258 | Mallory | July 27, 1943 |
| 2,449,480 | Houck | Sept. 14, 1948 |
| 2,563,127 | McGoffin | Aug. 7, 1951 |
| 2,589,130 | Potter | Mar. 11, 1952 |
| 2,648,831 | Vroom | Aug. 11, 1953 |
| 2,669,703 | Hammond | Feb. 16, 1954 |
| 2,734,180 | Pennow | Feb. 7, 1956 |
| 2,811,708 | Byrnes | Oct. 29, 1957 |
| 2,813,199 | Sciaky | Nov. 12, 1957 |
| 2,831,110 | Trousdale | Apr. 15, 1958 |